METHOD OF FABRICATING MAGNETIC PRINTER WRITE HEADS

Filed Oct. 29, 1958 4 Sheets-Sheet 1

INVENTORS
RALPH E. PAGE
THEODORE L. BULEY

BY Harry T. Berriman
AGENT

July 10, 1962 R. E. PAGE ET AL 3,042,999

METHOD OF FABRICATING MAGNETIC PRINTER WRITE HEADS

Filed Oct. 29, 1958 4 Sheets-Sheet 2

July 10, 1962 R. E. PAGE ET AL 3,042,999

METHOD OF FABRICATING MAGNETIC PRINTER WRITE HEADS

Filed Oct. 29, 1958

4 Sheets-Sheet 3

METHOD OF FABRICATING MAGNETIC PRINTER WRITE HEADS

Filed Oct. 29, 1958

3,042,999

METHOD OF FABRICATING MAGNETIC PRINTER WRITE HEADS

Ralph E. Page, La Grangeville, and Theodore L. Buley, Poughkeepsie, N.Y., assignors to International Business Machines Corporation, New York, N.Y., a corporation of New York Filed Oct. 29, 1958, Ser. No. 770,439
1 Claim. (Cl. 29—155.5)

This invention relates to an improved method for fabricating a magnetic printer writing head and also to provide an improved magnetic printer write head as resulting from the improved method.

A magnetic printer write head may comprise a series of elongated pole pieces each of which is inserted into a mating hole in a block of permeable material. The pole pieces are arranged in the related mating holes so that one predetermined end of all the poles is exposed, the holes being so arranged that with the pole pieces positioned therein, the exposed pole piece ends form a line of spaced pole ends flush with the surface of the block. The supporting block also includes suitable openings therein to accommodate an associated activating current coil which surrounds each pole piece at some point along the length thereof.

A magnetizable medium such as a drum or tape having high remanent magnetic characteristics is positioned adjacent the line of exposed core ends and the surface of the drum or tape is displaced laterally to the line of exposed pole ends. As the magnetizable medium moves, the coils of the pole pieces are energized singly and/or in combination as successive positions of the magnetizable medium are presented thereto, the energized coils establishing a magnetic flux in the related core which extends therethrough in a path to the exposed pole end, through the adjacent surface of the magnetizable medium, back through the magnetizable supporting block of the cores to the other end of the cores. By this action a pattern of magnetic "spots" forming desired numerals, letters, or characters or the like, are "written" on the tape or drum surface and these characters may be developed and transferred to paper sheets, if desired, in ways well known to those versed in the art.

In order to form letters, numerals, etc. of good definition and conventional size, the write head pole pieces are in the range of .005 inch in diameter and are closely spaced in the range of .010 inch between centers of adjacent pole pieces. With coils in the range of .002 inch in thickness about each core, the actual spacing between the adjacent cores and coils at the coil area is only .001 inch. As a result of these required small dimensions, it has been necessary to drill the holes in the supporting block (and which also is a magnetic circuit return) for the cores and coils by very precise methods such as ultra-sonic drilling and this has made it impossible to manufacture printer heads of reasonable cost and of uniform electrical and physical characteristics.

It is accordingly a principal object of the invention to provide an improved method for fabricating magnetic printer write heads of uniform electrical and physical characteristic and at low cost.

It is another object to provide an improved method for fabricating magnetic printer write heads by accurately maintaining a plurality of core members in a spaced relationship and then potting a permeable material thereabout.

It is a still further object to provide an improved method for fabricating magnetic printer write heads by accurately maintaining a plurality of magnetic core members in a spaced relationship, potting a permeable material thereabout with at least one end of corresponding ends of said core members extending beyond the potted compound, inserting individual coil winding means on the extending ends of each of said core members, and then potting additional permeable material about said coils to form a unitary head structure.

Another object of the invention is to provide an improved magnetic printer write head comprised of a plurality of spaced writing cores wherein the cores are accurately supported in a desired write position by a member comprised of a binder and particles of magnetic material interspaced in said binder, said member also serving as a magnetic return for said cores.

Other objects of the invention will be pointed out in the following description and claim and illustrated in the accompanying drawings, which disclose, by way of example, the principle of the invention and the best mode, which has been contemplated, of applying that principle.

Figure 1:
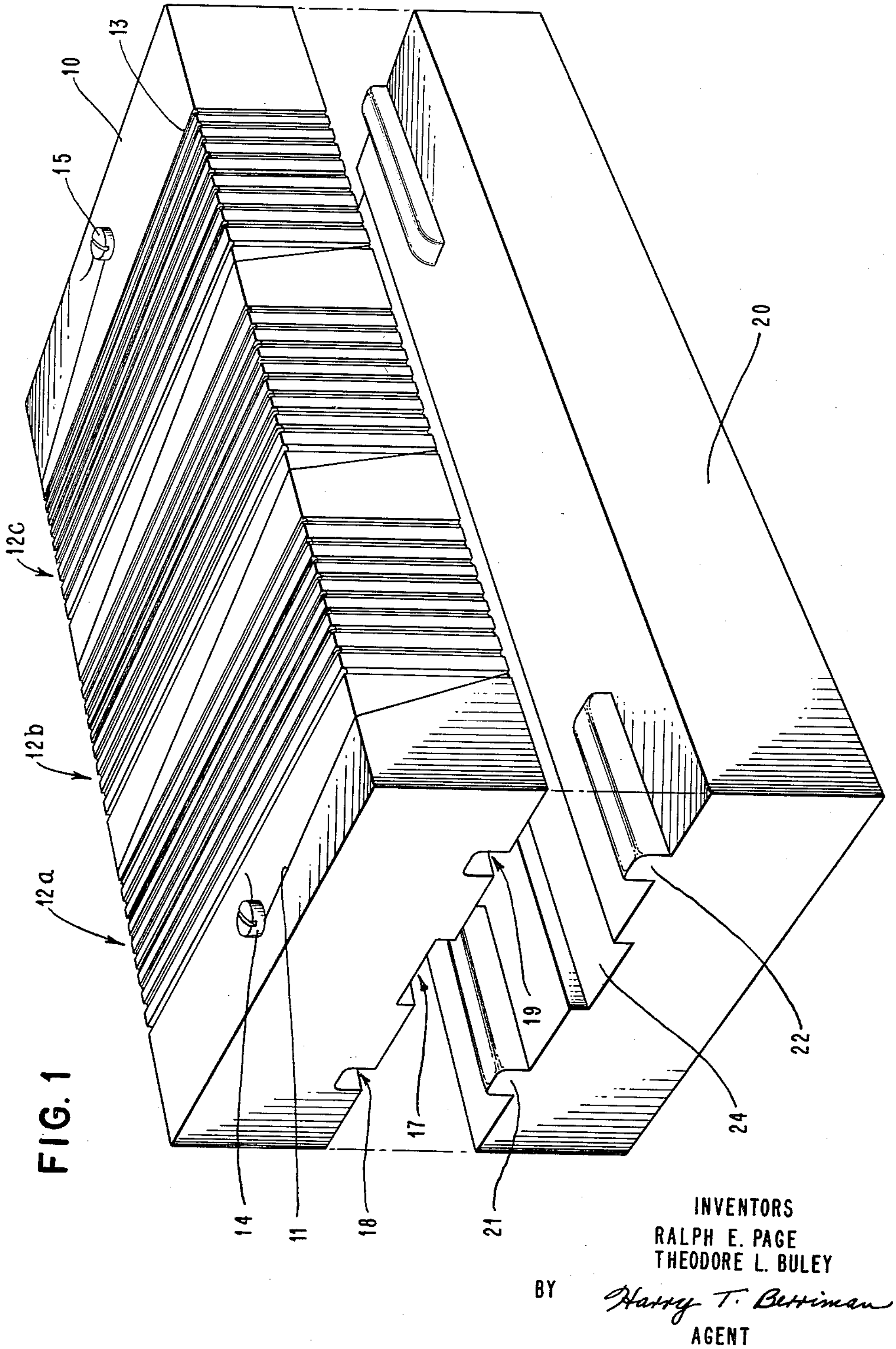
FIG. 1 is an exploded projection view of a first jig utilized to support the magnetic core members in an accurately spaced manner, FIG. 1 also showing another jig member for cooperation with the first jig member during an initial potting operation in forming a magnetic head blank.

Referring now to FIG. 1, the improved method of manufacturing magnetic printer write heads starts with wrapping a jig member 10 with electrical iron wire 11. The jig member 10 which is formed of brass or some other suitable material contains a series of 3 groups, 12*a*, *b*, *c*, of grooves 13 therein, there being 9 grooves in each group, the spacing between adjacent grooves in a group being approximately .010 inch. One end of the electrical iron wire is attached to a fastening 14 of the jig 10. The wire 11 which is approximately .005 in diameter is then wrapped as elongated coil or helix on the jig 10, each successive coil loop being engaged in succeeding grooves of each group, as indicated, the other end of the wire being finally wrapped around another fastening 15 to secure the wire. The wire 11 has low magnetic remanence $B_y$ and serves as the core material for 3 complete printer write heads as will be later evident.

It will be noted in FIG. 1 that the jig 10 contains a slot 17 in the one surface thereof, the slot extending longitudinally from one end of the jig to the other. Each successive coil loop of the wire 11 wrapped thereon has a corresponding portion thereof extending laterally across the slot 17. The jig 10 also contains adjacent the slot 17 and near each end area thereof, a pair of short slots 18 and 19. Each pair of slots 18 and 19 extend in from the adjacent end of the jig 10 only a short distance and stop short of the nearmost strand or coil loop of wire 11 of the adjacent group 12*a* or 12*c*, as the case may be.

Adapted for engagement with the jig member 10 is a mating jig member 20 as also seen in FIG. 1. The jig member 20 is also formed of brass or some other suitable material and includes a pair of rectangular projections 21 and 22 extending from one surface thereof near the end areas thereof. The projections 21 and 22 are adapted to mesh the slots 18 and 19 of the jig member 10 to achieve a closely fitted jig assembly as may be visualized from FIG. 1. The jig member 20 includes a slot 24 on the one surface thereof, as indicated, the slot 24 extending longitudinally from one end of the jig member 20 to the other. With the two jig members 10 and 20 interfitted, the slot 24 of member 20 and the slot 17 of jig member 10 are aligned to form a rectangular opening or cavity from one end of the jig assembly to the other end, it will be appreciated that with the jig member 10 having been previously wrapped with the wire 11 as explained hereinbefore, a corresponding portion of each successive coil loop of the groups 12*a*, *b* and *c* extend laterally across approximately the midsection of the rectangular cavity in the assembled jigs. The two jig members 10 and 20 are maintained in their assembled position by suitable clamping means (not shown) applied thereto.

Thereafter, the jig assembly is placed on end with one end of the rectangular cavity or opening therethrough engaging a suitable liquid sealing surface. With the assembly so positioned, a flowing potting material is dumped into the open end of the rectangular opening formed by juxtapositioned slots 17 and 24 until the opening is filled. As the opening is filled, the potting compound flows about that portion of each coil loop of the wire 11 that crosses the rectangular opening.

The actual potting compound may be comprised of the following materials in the following proportions.

12 parts of epoxy resin
7 parts of a hardening agent for the resin
8.5 parts of a ferrite powder having low magnetic remanence ($B_y$)

Figures 2, 4, 5:
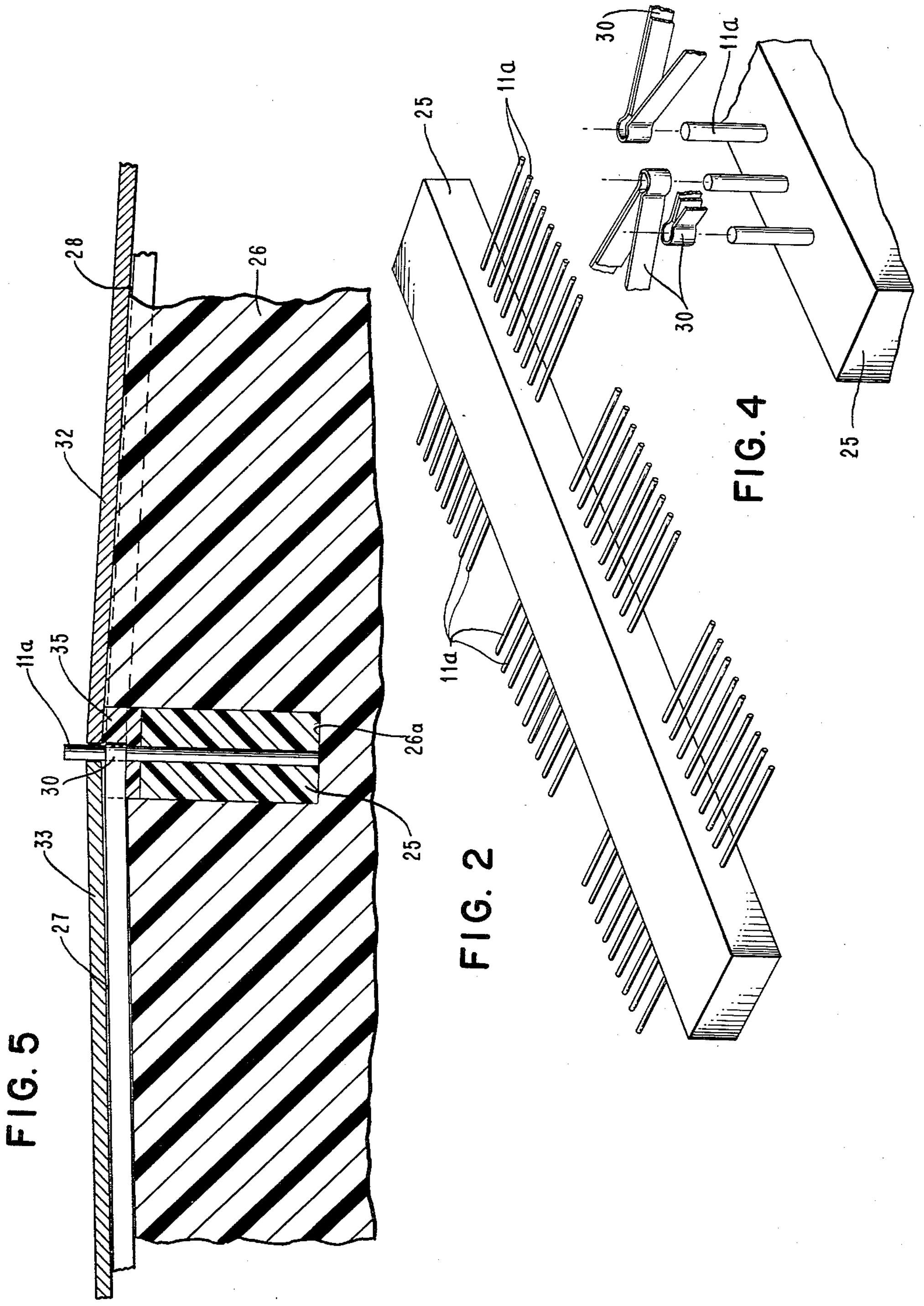
FIG. 2 is a projection view of the magnetic head blank after the completion of a first potting operation, the blank having been removed from the cooperating jigs of FIG. 1.
FIG. 4 is a diagrammatic projecting view illustrating the manner in which individual activating coils are inserted on each core member of the magnetic head blank.
FIG. 5 is a partial vertical section view taken on the plane of the line 5—5 of FIG. 3B after the final potting operation has been completed, the figure showing the cooperating plates in operational position.

The above ingredients are thoroughly mixed to insure an even dispersal of the ferrite powder in the mixture, whereafter, the rectangular opening in the jig assembly is filled as previously explained. After a sufficient period of time for the mixture in the jig assembly to completely harden, the clamping means are removed from the assembly and the jig member 20 is removed from the jig member 10. The coil loops of wire 11 encompassing the jig member 10 are then cut at some line thereupon and a cast printer head blank or slug 25 having projecting pigtails 11*a* of the wire strands, as indicated in FIG. 2, is removed from the slotted area 17 of jig member 10.

Figure 3A:
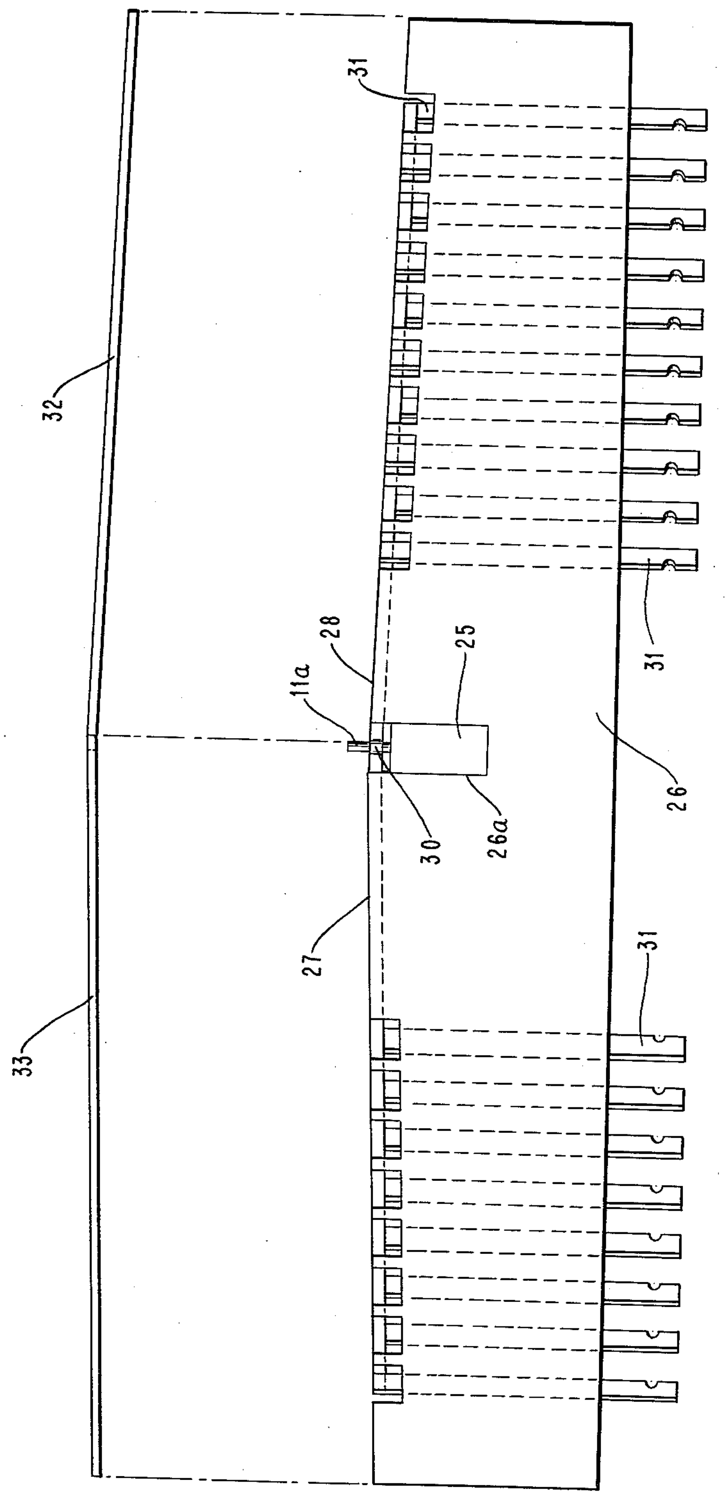
FIG. 3A is a front elevational view of a final write head assembly with the magnetic head blank indicated in position and prior to a final potting operation, the figure also showing in a removed position (to facilitate illustration), cooperating plates for accurately maintaining the cores in position during the final potting operation.
Figure 3B:
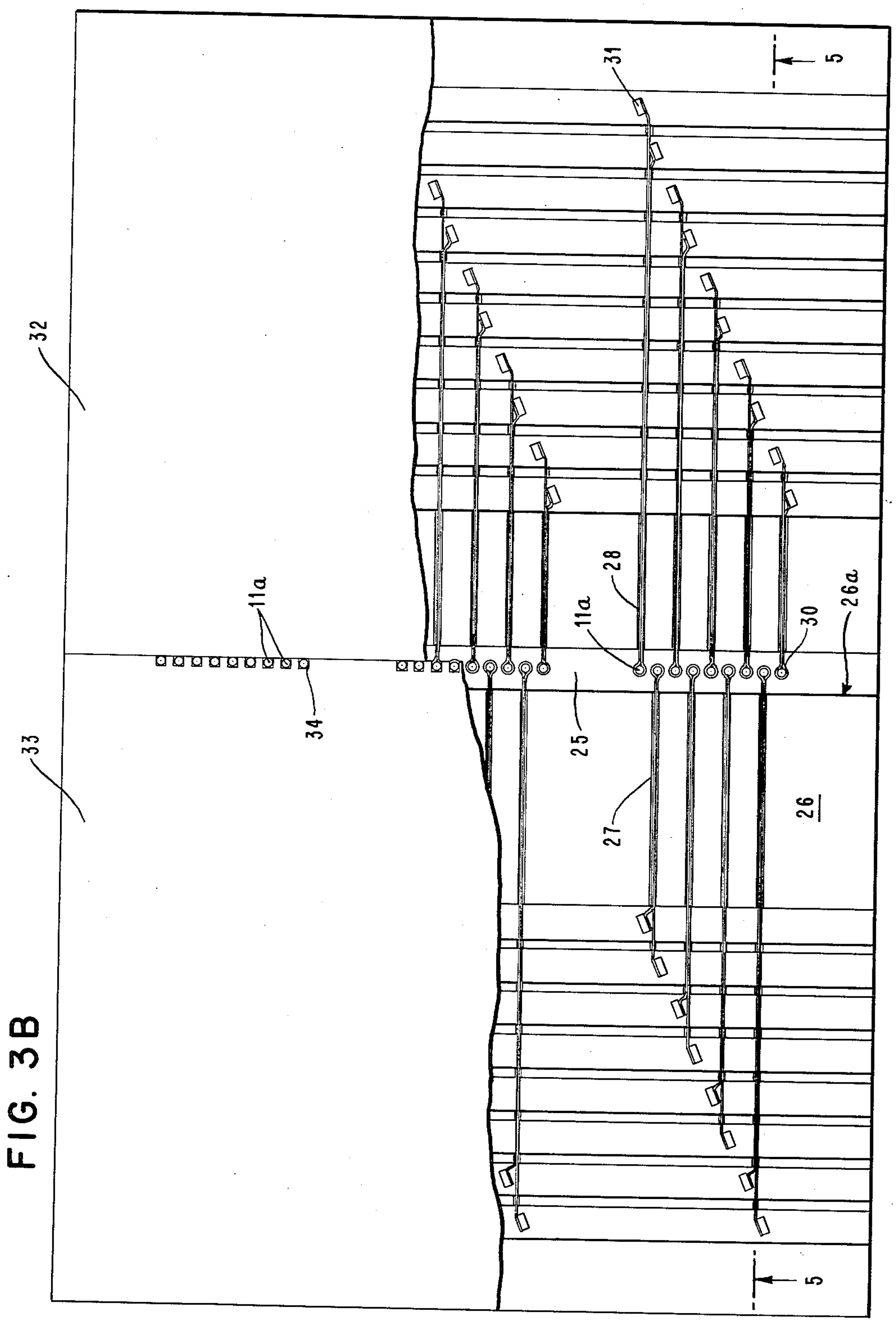
FIG. 3B is a top plan view of FIG. 3A, the cooperating plates being broken away to facilitate illustration.

Referring now to FIGS. 3A and 3B there is shown a supporting member for the printer write head. The supporting member comprises a trapesoidal shaped block 26 of any suitable plastic material or the like which has a longitudinally extending slot in the upper surface thereof of a dimension to accommodate the printer head blank 25. After the printer blank or slug 25 is removed from the jig member 10, the strands of wire 11*a* extending from the one surface thereof are cut flush with the related surface. The blank is then positioned in a slot 26*a*, of the member 26 as indicated in FIG. 3 with the surface of the blank having the wire strands flush resting on the bottom of the slot 26*a* while the other surface of the blank 25 with the strands of wire 11*a* projecting upwardly therefrom as indicated. It will be noted in FIG. 3A that the slot 26 is of a sufficient depth to more than accommodate the blank 25 so that the upper surface of the blank 25 is below the surface of the block 26 and accordingly confined between the walls of the slot 26*a*.

With the printer head blank 25 arranged in the slot 26*a* as described above, it is shifted longitudinally in the slot to accurately align each of the groups of projecting wire strands 11*a* with a related group of slots 27 and 28 (see FIG. 3B) extending laterally to the slot 26*a* in the upper surface of the supporting block 26. An individual coil 30 comprised of a single turn of .002 x .020 silver strip insulated on an inward side is then positioned over each of the upwardly projecting strands of wire 11*a* as diagrammatically represented in the partial view shown in FIG. 4. The two leads of each coil 30 are both guided through a related one of the slots 27 or 28 to an individual corresponding terminal 31 to which it is welded, the terminal extending through the block 26 and projecting beyond the bottom surface thereof so that an electrical connection may be made thereto. The coils are inserted on the pole pieces or extending strands of wire 11*a* in an alternating pattern as indicated in FIGS. 3B and 4, that is each pair of any two adjacent coils are accommodated in the slots 27 or 28 on opposite sides of the slot 26*a*. The insulated side of each of the coils is inward and with the coils positioned in place, the clearance between coils on adjacent pole pieces is in the range of only .001 inch.

With the coils properly placed on the core pieces of each of the 3 groups of 9 core pieces or strands 11*a* of the printer head blank 25, the coils are completely confined within the slot 26*a* of the block, and with the upper surface of the coils being below the upper surface of the block 26.

Thereafter, a plate 32 (indicated in a removed position in FIG. 3A) is accurately positioned on the upper surface of the block (see FIGS. 3B and 5) so that the one edge thereof is centrally aligned with approximately the center of the slot 26*a* and abutting the extending core poles of the blank 25, the plate 32 being rigidly clamped to the block 26 in any suitable manner (not shown). With the plate 32 properly positioned, a plate 33 having serrations or openings 34 along the edge thereof each of a size to accommodate a related core pole or wire strand 11*a* and spaced to maintain the desired spacing of .010 between centers of adjacent core pieces of each group, is positioned on the upper surface of the block 26 on the other side of the slot 26*a* and then moved so that the comb like edge thereof abuts the adjacent edge of the previously positioned plate 32. As the plate 33 is moved into position, each extending core piece or wire strand of the blank 25 is, of course, guided into engagement with the related opening 34 thereof. The plate 33 is then clamped to the block in any suitable manner and it is evident that the two plates 32 and 33 accurately support the projecting pole ends of the head blank 25 in desired upright and accordingly spaced positions. With the plates 32 and 33 in position there is a cavity between the undersurface thereof and the upper surface of the printer head blank 24. As mentioned previously, the plates 32 and 33 are not shown in their actual operative position in FIG. 3A but in a removed position in order to facilitate the showing of other elements.

With the plates 32 and 33 clamped in position as described above, the entire assembly is placed on end with the opening between the plates 32, 33 and blank 25, engaging a suitable liquid sealing surface. The same type potting compound used to originally form the blank 25 is then poured into the open end of the last mentioned opening to completely fill the cavity between the blank 25 and plates 32 and 33, this additional material being indicated by the reference character 35 in FIG. 5. After a period of time sufficient for the potting compound to harden, the plates 32 and 33 are removed from the block 26. The pole pieces or wire strands still projecting above the surface of the newly potted section are then cut off and the exposed core ends and the associated newly potted area are lapped to achieve a smooth final printer write head surface. It will be appreciated that the individual activating coils for each of the core pieces are now fully embedded in the hardened potting compound. By reason of the iron powder dispersed through the potting material the cores and coils, there is provided a low reluctance magnetic return path for the magnetic flux generated in a core pole by passing a suitable current through the related coil 30. It will be appreciated that the solidified potting compound in the final head assembly actually serves a dual purpose in that it is the actual supporting member for maintaining the writing cores in the desired accurate spacing arrangement and, as just mentioned, also serves by reason of the magnetic characteristics thereof as the magnetic return path for the core flux.

In the particular final printer head shown in the figures, there are provided 3 groups of writing core poles, there being 9 cores per group. The cores of each group are energized singly and in combination as a magnetizable surface is displaced past the head to "write" a pattern of spots thereon in the shape of desired characters, or numerals. By reason of the three distinct groups of cores, 3 lines of data may be written simultaneously. The three groups of cores and inclusion of 9 cores in each group is, of course, only representative and other arrangements as to groups and cores per group may be effected as required by appropriately changing the various jigs, etc.

The improved method for fabricating the printer writing head provides a head having the necessary close spacing between adjacent cores of each group, and also provides a head having the desired magnetic characteristics by reason of the magnetic characteristics of the potting compound, and provides the two previously listed head characteristics in a simple, economical, manner which is readily reproducible so that large scale manufacture of improved magnetic printer write heads having very uniform characteristics is possible.

It will be appreciated that although jig member 10 is utilized as the initial core supporting and spacing means and in conjunction with mating jig member 20 provides a suitable cavity about the accurately supported cores to receive the magnetizable potting compound to form the initial type head blank, other forms of single or multiple form jigs would readily suggest themselves to those skilled in the art. Consequently the present method is not intended to be confined to the forms and details of the particular type cooperating jigs shown, but encompasses the method wherein as a first step, any suitable means are provided to accurately space and support a plurality of core members while a magnetizable potting compound is thereafter suitably contained thereabout to form the initial type head slug with pole pieces extending therefrom. Thereafter, in subsequent steps of the operation, individual windings are inserted on each of the extending ends of the pole pieces, the extending pole pieces being again supported in an accurate and spaced relationship while additional amounts of the same magnetizable potting compound is potted about said coils to form a continuous magnetic path with the body of the initial type slug portion.

As a final step of the method the projecting core end portions of the cores which are to form the final core areas for cooperation with a magnetizable medium, are removed in any suitable manner flush with the adjacent hardening potting compound to form the final operational head. Although in the particular final form of the head shown in FIG. 5, the ends of the embedded cores nearest the windings becomes the operational exposed core areas, it will be appreciated that the other ends of the cores furthest from the windings may become the operational core areas if the elements are so arranged that these core areas may be exposed flush with the surface of the adjacent potting compound. The manner in which the ends are exposed flush is of no consequence and can be achieved by grinding or lapping etc. or the desired exposed operational ends can also be achieved in the potting operations by potting the material to a level so that the core ends are not covered.

While there have been shown and described the fundamental novel features of the invention as applied to a preferred embodiment, it will be understood that various omissions and substitutions and changes in the form and details of the method illustrated may be made by those skilled in the art without departing from the spirit of the invention. It is the intention therefore, to be limited only as indicated by the scope of the following claim.

What is claimed is:

A method of fabricating a magnetic printer write head assembly, comprising the steps of wrapping magnetizable iron wires in a coil form on a first jig member, said jig member having a plurality of accurately spaced grooves for receiving each successive coil loop of said wire and for maintaining each loop in an accurate and spaced side by side relationship to the succeeding coil loop, said jig member having a slot in one surface thereof and extending transversely to corresponding portions of the coil loops at a particular area thereof, engaging a second jig member with said first, said second jig member having a slot similar to said first and aligned therewith when said jigs are engaged so that said slots form an elongated cavity with said corresponding portions of the coil loops extending transversely thereacross; flowing a potting compound into said cavity to fill it and enclose said corresponding positions of the coil loops, said potting compound having magnetic properties, removing said second jig from said first jig after said compound has hardened thus exposing the solidified slug formed in said cavity, cutting said wire loops on said first jig at points removed from slug and removing said slug from said first jig member, said slug having pigtail ends of said imbedded coil portions extending from opposed sides thereof; removing said pigtails flush with one surface of said slug, positioning said slug in a cavity in one surface of a supporting member formed of non-magnetic material, said cavity being of the general shape of said slug but of a greater depth so that the slug is confined within the walls of the cavity with the remaining pigtail ends extending from said slug beyond an outer surface of said supporting member; inserting an individual energizing winding on each of said extending ends, said windings being also accommodated within the confines of said supporting member cavity the leads of each winding being inserted in a related groove extending transversely from said supporting member cavity to a related electrical terminal carried by said supporting member; securing guide and supporting means to said supporting member, said guide and supporting means being positioned to support each pigtail extending beyond its related winding in a desired final operational position, filling the remaining unoccupied portion of said cavity about said windings with said same potting compound having magnetic properties, said last cavity being filled so that one surface thereof is flush with an adjacent outer surface of said supporting member, removing said pigtail guide and supporting means, grinding said pigtail extensions flush with the adjacent surface of said last potted material, and finally attaching the leads of each winding to its associated electrical terminal.

References Cited in the file of this patent

UNITED STATES PATENTS

| | | |
|---|---|---|
| 2,197,465 | Brunetti | Apr. 16, 1940 |
| 2,242,117 | English et al. | May 13, 1941 |
| 2,674,031 | Buhrendorf | Apr. 6, 1954 |
| 2,674,659 | Buhrendorf | Apr. 6, 1954 |
| 2,676,392 | Buhrendorf | Apr. 27, 1954 |
| 2,677,019 | Buhrendorf | Apr. 27, 1954 |
| 2,760,036 | Raymer | Aug. 21, 1956 |
| 2,806,188 | Kastner et al. | Sept. 10, 1957 |
| 2,841,461 | Gleason | July 1, 1958 |
| 2,867,894 | Hill | Jan. 13, 1959 |
| 2,907,100 | Lindblad | Oct. 6, 1959 |
| 2,914,600 | Smith et al. | Nov. 24, 1959 |
| 2,966,726 | Gallentine et al. | Jan. 3, 1961 |
| 2,966,727 | Gallentine | Jan. 3, 1961 |
| 2,967,083 | Gallentine | Jan. 3, 1961 |